(12) United States Patent
Roux

(10) Patent No.: US 10,185,293 B2
(45) Date of Patent: Jan. 22, 2019

(54) DEVICE AND METHOD FOR CONTROLLING A MOTOR-DRIVEN MOBILE SCREEN HAVING ADJUSTABLE SLATS

(75) Inventor: Morgan Roux, Passy (FR)

(73) Assignee: SOMFY SAS, Cluses (FR)

( * ) Notice: Subject to any disclaimer, the term of this patent is extended or adjusted under 35 U.S.C. 154(b) by 511 days.

(21) Appl. No.: 13/995,669

(22) PCT Filed: Dec. 22, 2011

(86) PCT No.: PCT/EP2011/073812
§ 371 (c)(1),
(2), (4) Date: Aug. 9, 2013

(87) PCT Pub. No.: WO2012/085216
PCT Pub. Date: Jun. 28, 2012

(65) Prior Publication Data
US 2013/0310984 A1    Nov. 21, 2013

(30) Foreign Application Priority Data
Dec. 22, 2010  (FR) ...................... 10 61014

(51) Int. Cl.
*G05B 15/02* (2006.01)
*E06B 9/32* (2006.01)
*G06F 3/0354* (2013.01)
*G06F 3/0484* (2013.01)

(52) U.S. Cl.
CPC ............. *G05B 15/02* (2013.01); *E06B 9/32* (2013.01); *G06F 3/03543* (2013.01); *G06F 3/04847* (2013.01)

(58) Field of Classification Search
CPC ..................................... G05B 19/02
USPC .................................... 700/275
See application file for complete search history.

(56) References Cited

U.S. PATENT DOCUMENTS

| 6,606,101 B1* | 8/2003 | Malamud ............ G06F 3/04812 345/473 |
| 6,792,323 B2 | 9/2004 | Krzyanowski et al. |
| 1,486,640 A1 | 1/2005 | Bejean |
| 1,748,145 A1 | 1/2007 | Bejean et al. |
| 2,196,878 A1 | 6/2010 | Duchene et al. |

(Continued)

FOREIGN PATENT DOCUMENTS

| EP | 1486640 A | 12/2004 |
| EP | 1748145 A | 1/2007 |
| EP | 2196878 A | 6/2010 |

OTHER PUBLICATIONS

E.S. Lee, D.L. DiBartolomeo, F.M. Rubinstein, S.E. Selkowitz, Low-cost networking for dynamic window systems, Energy and Buildings, vol. 36, Issue 6, Jun. 2004, pp. 503-513.*

(Continued)

*Primary Examiner* — Christopher E. Everett
(74) *Attorney, Agent, or Firm* — Huag Partners LLP

(57) ABSTRACT

The invention relates to a method for controlling a motor-driven mobile screen having adjustable slats by means of an electromechanical actuator in a building, the control being implemented from a control interface including at least one control button for extending the screen and an element for assisting in the movement for adjusting the slats. The invention also relates to a control interface for implementing the method.

27 Claims, 5 Drawing Sheets

(56) References Cited

U.S. PATENT DOCUMENTS

| | | | | |
|---|---|---|---|---|
| 8,271,906 | B1* | 9/2012 | Fong | G06F 9/4443 345/157 |
| 2003/0035012 | A1* | 2/2003 | Kurtenbach | G06F 3/0482 715/810 |
| 2005/0001574 | A1* | 1/2005 | Bejean | 318/468 |
| 2005/0039141 | A1* | 2/2005 | Burke | G06F 3/0482 715/810 |
| 2006/0028445 | A1* | 2/2006 | Hinckley | G06F 3/03543 345/157 |
| 2006/0259183 | A1 | 11/2006 | Hayes et al. | |
| 2007/0250793 | A1* | 10/2007 | Miura | G06F 3/0482 715/810 |
| 2008/0270937 | A1* | 10/2008 | Poulet | G05B 19/0426 715/810 |
| 2010/0146423 | A1* | 6/2010 | Duchene et al. | 715/765 |
| 2010/0231421 | A1* | 9/2010 | Rawls-Meehan | 341/20 |
| 2010/0312366 | A1* | 12/2010 | Madonna | H05B 37/0245 700/90 |
| 2011/0055754 | A1* | 3/2011 | Nicholas, III | G06F 3/0481 715/810 |
| 2012/0265909 | A1* | 10/2012 | Mignot | 710/106 |

OTHER PUBLICATIONS

K.L. Norman, "The Psychology of Menu Selection: Designing Cognitive Control at the Human/Computer Interface," Ablex Publishing Corporation, 368 pages, 1991.*

* cited by examiner

DEVICE AND METHOD FOR CONTROLLING A MOTOR-DRIVEN MOBILE SCREEN HAVING ADJUSTABLE SLATS

This application is a 371 of PCT/EP2011/073812 filed on Dec. 22, 2011, published on Jun. 28, 2012 under publication number WO 2012/085216, which claims priority benefits from French Patent Application Number 1061014 filed Dec. 22, 2010, the disclosure of which is incorporated herein by reference.

The invention concerns the field of electromechanical actuators allowing the motorised driving of screen or solar protection elements positioned at openings in a building. In particular, it concerns a device for controlling an electromechanical actuator driving a mobile screen having adjustable slats, such as a roll blind with adjustable slats, an indoor or outdoor Venetian blind or adjustable panels.

From application EP1486640 a remote control is known comprising an interface controlling a mobile screen with adjustable slats, the control interface comprising buttons to control opening and closing movements of the screen, and a separate interface to control orientation of the slats. The separate interface is chiefly in the form of a thumbwheel allowing the intuitive and fine-tuned adjusting of the desired orientation of the slats by rotating the thumbwheel through one or more notches.

From application EP1748145 a specific arrangement is also known of the above-described control interface. The thumbwheel for controlling orientation lies in a central axis, whilst the control buttons used for translation of the slats (opening and closing of the screen) are positioned either side of the thumbwheel. Therefore, the two control interfaces are quite separate and the arrangement prevents the inadvertent actuation of one of the translation control buttons when adjusting slat orientation by action on the thumbwheel, or conversely.

In the same field of home automation, control interfaces are known for various items of household equipment using a touch screen. In particular, application EP2196878 describes a control interface of screen type, part of the screen being allocated to the display of graphics symbolising this equipment, and optionally means for adjusting the equipment. By acting either directly on the graphical representation of the item of equipment, or on the adjustment means, the graphical representation of the equipment is modified to display at least approximately the desired extent of orientation and/or deployment of the mobile product. A command corresponding to this extent of orientation or deployment can then be given.

This interface is advantageously used with a tactile screen. Outside this configuration, it is necessary to provide new control buttons which will not necessarily correspond to desired simplification of control ergonomics.

The invention therefore proposes to solve the cited problems related to the prior art, and to offer a control interface which is both intuitive and simple.

According to the invention, the method for controlling a motor-driven mobile screen with adjustable slats in a building using an electromechanical actuator, the method being implemented through a control interface comprising at least one deployment control button and a scroll-assisting element for adjustment of slat orientation, comprises:

a. a step to detect mechanical action on a main button, a secondary button or an element for assisted scrolling of a pointer associated with a computer;

b. a step to interpret the detected action as a deployment command or slat adjustment command.

According to the invention, the control method may comprise a prior step to activate a software element on a computer linked to the pointer tool.

According to the invention, the step to activate the software element may comprise the activation of a graphical control element.

According to the invention, the activation of the graphical control element may comprise the positioning of a pointer of the pointing element on the graphical control element.

According to the invention, the method may comprise a display step on a computer screen, to display at least in part a graphical representation of a remote control with thumbwheel.

According to the invention the control method may comprise a display step on a computer screen of one or more icons representing an item of automated equipment to be driven, these icons being positioned on a plan of the building.

According to the invention, double activation (double-click) of one of the buttons of the pointer tool may cause the transmitting of a deployment command towards a predefined intermediate position.

According to the invention, the method may comprise a prior pairing step between the actuator and a device for transmitting commands linked with the computer.

According to the invention, the control device giving commands may be a transmitter connected to the computer.

According to the invention, the command transmission device may be a transmission unit linked via Internet to the computer.

According to the invention, the control interface for controlling a motor-driven mobile screen with adjustable slats by means of an electromechanical actuator, this control interface comprising a screen and graphical representation of a software element on this screen, comprises a computer pointer tool comprising a main button, a secondary button and a scroll-assisting element, and software means for implementing the method such as described above to set up a functional link between the main and secondary buttons of the pointer tool and a deployment command, and a functional link between the scroll-assisting tool and an adjusted orientation command.

According to the invention, the control interface may comprise a wireless command transmitter capable of communicating with the actuator.

According to the invention, the use of a pointer tool linked to a personal computer, comprising a main button, a secondary button and a scroll-assisting element, to control a motor-driven mobile screen with adjustable slats by means of an electromechanical actuator, is such that mechanical action on one of the buttons or on the scroll-assisting element respectively causes a deployment command or a slat adjustment command.

According to the invention, the use of a pointer tool linked to a personal computer, comprising a main button, a secondary button and a scroll-assisting element to control an illumination device with adjustable light intensity, is such that mechanical action on one of the buttons, respectively on the scroll-assisting element, causes a switch-on or switch-off command for the illumination device and, respectively, a command to vary light intensity.

The invention will be better understood by persons skilled in the art from the detailed description of one embodiment with reference to the accompanying drawings in which.

Figure 3:
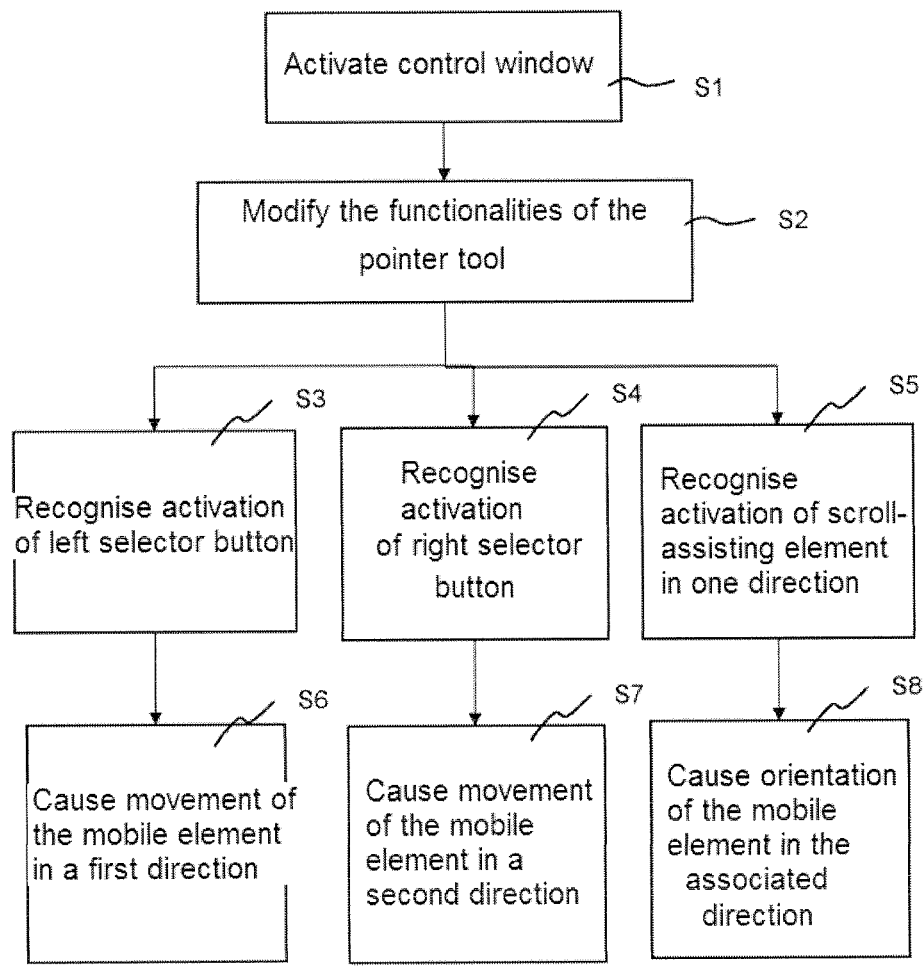
Figure 4:
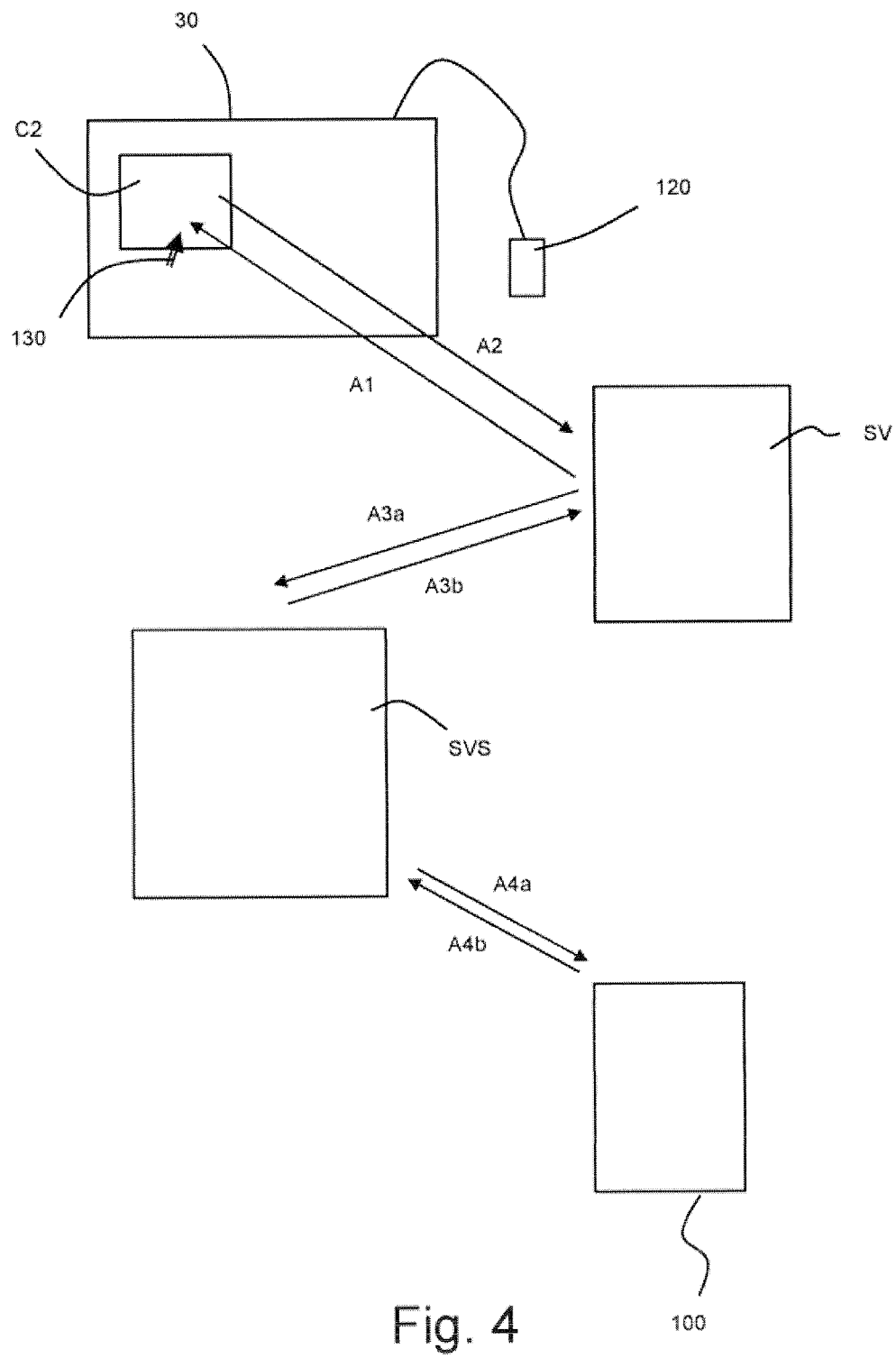
Figure 5:
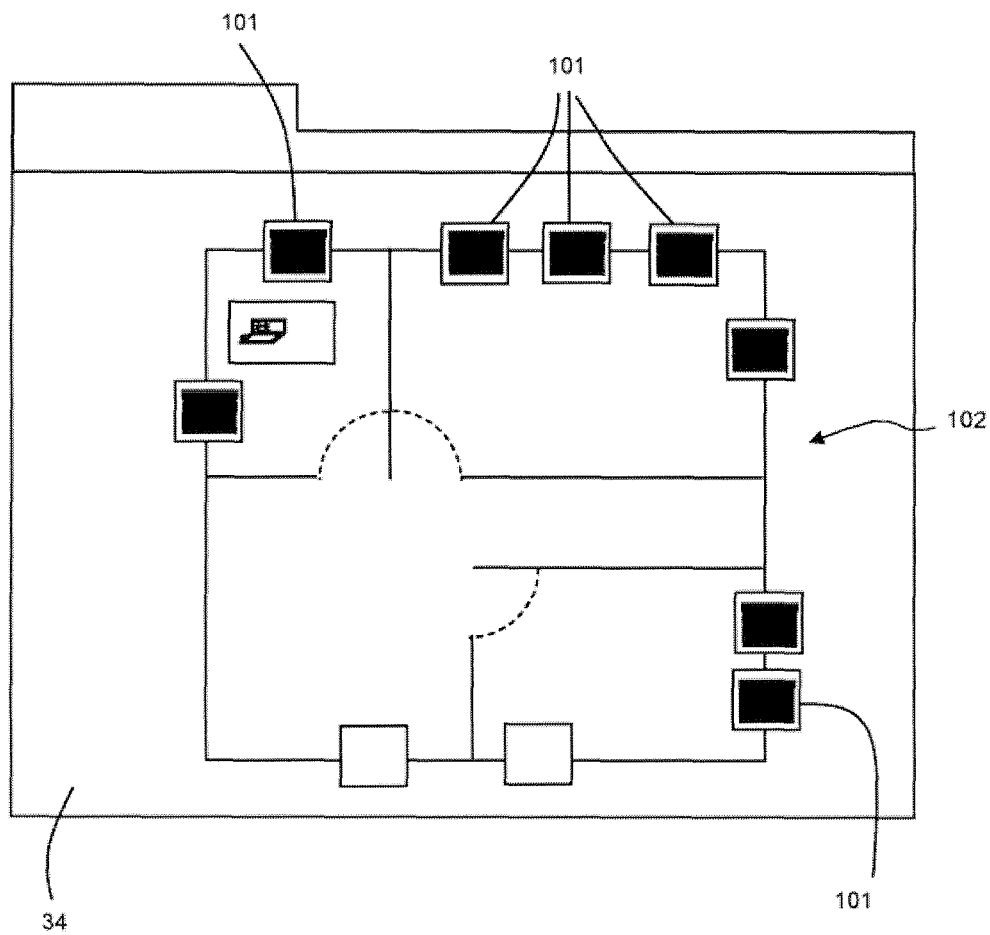

FIG. 3 schematically illustrates a control method according to the invention;

FIG. 4 illustrates architecture of the communication system lending itself to implementation of the invention;

FIG. 5 illustrates an interface page displayed on a computer screen to implement the control method of the invention.

Figure 1:
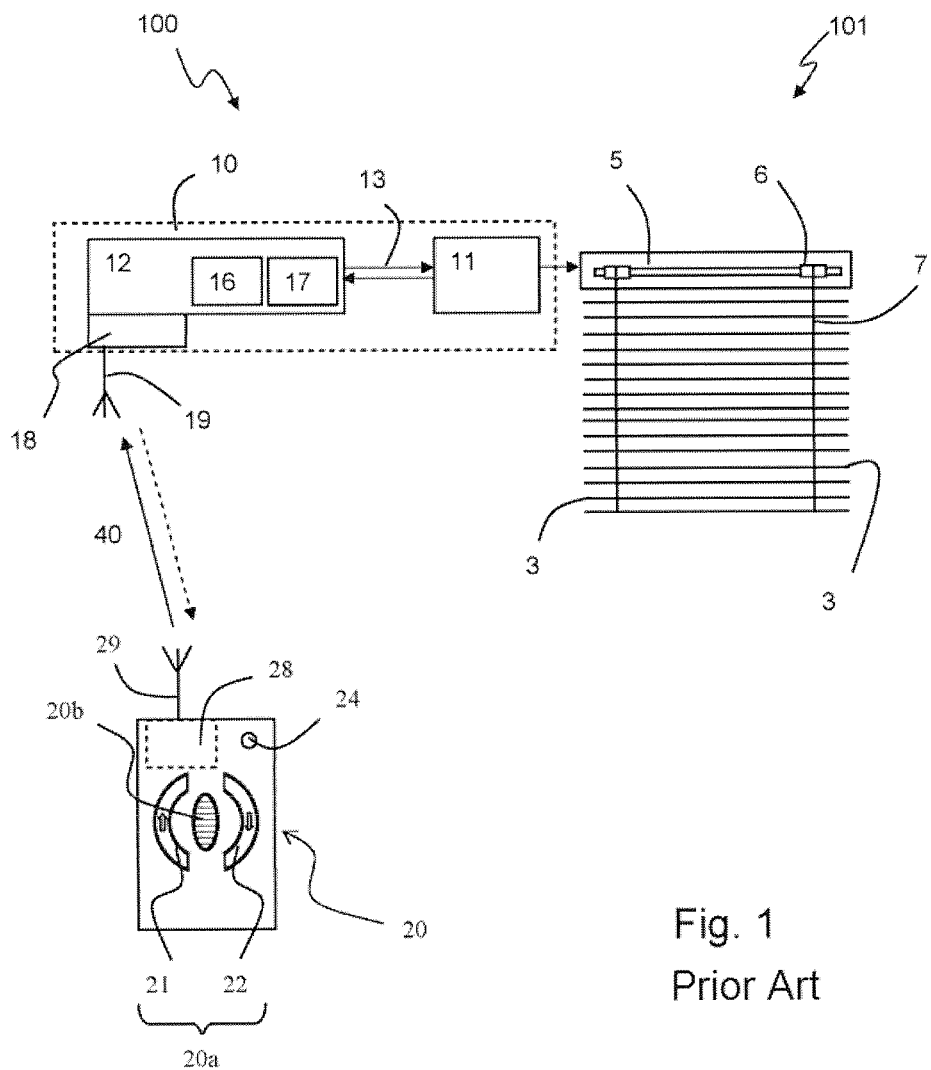
FIG. 1 illustrates a motor-driven screen device of the prior art.

FIG. 1 schematically illustrates a prior art motor-driven screen device 100. The motor-driven screen device with adjustable slats e.g. a Venetian blind comprises an assembly of slats 3 mobile in translation and in rotation. These slats are held in position and driven by a system of lifting and tilting cords, these cords being connected to a shaft and winding reels inside a box housing 5. The screen is driven in movement by an electromechanical actuator 10, in particular an electromechanical actuator arranged in the box housing (and shown outside the box for legibility of the Figure). The actuator comprises an electromechanical part 11 (motor, gear, brake) connected to an electronic control unit 12. The control unit drives the operations of the electromechanical part of the actuator by transfer of information (mainly in the form of electric switching) symbolised by a double arrow 13.

The actuator may comprise various sensors, such as a torque sensor 16, a position sensor 17.

It also comprises a command receiver 18 (for an actuator with two-dimensional communication, the command receiver is therefore a transmitter-receiver) provided with an antenna 19 and hardware and/or software means allowing its operation to be governed in accordance with the method subject of the invention.

The device is associated with a control point 20 connected via a wire or wireless communication network 40. The control point for example comprises a first assembly 20a of two keys 21 and 22 allowing the transmission of an opening or closing command of the screen. For this purpose, the control point comprises a command transmitter 28 equipped with an antenna 29, the command transmitter being capable of communicating with the command receiver of the actuator.

When this command is received by the receiver of the actuator, it is translated into mechanical action causing the opening or closing of the screen by stacking the slats at a top position close to the boxed housing or by deploying the slats towards a bottom position.

A central element 20b e.g. in the form of a thumbwheel, allows commanding of the orientation of the slats in a first direction or a second direction. A light emitting diode 24 (or any other graphical interface e.g. a screen) allows viewing of information at the control point.

The commands transmitted by the control point either directly to the command receiver or via a control unit not illustrated, comprise an indication of the type of command (open, close, orientation in direction 1 or direction 2, intermediate positioning, etc.) which qualifies the mechanical movement to be imparted to the blind.

Figure 2:
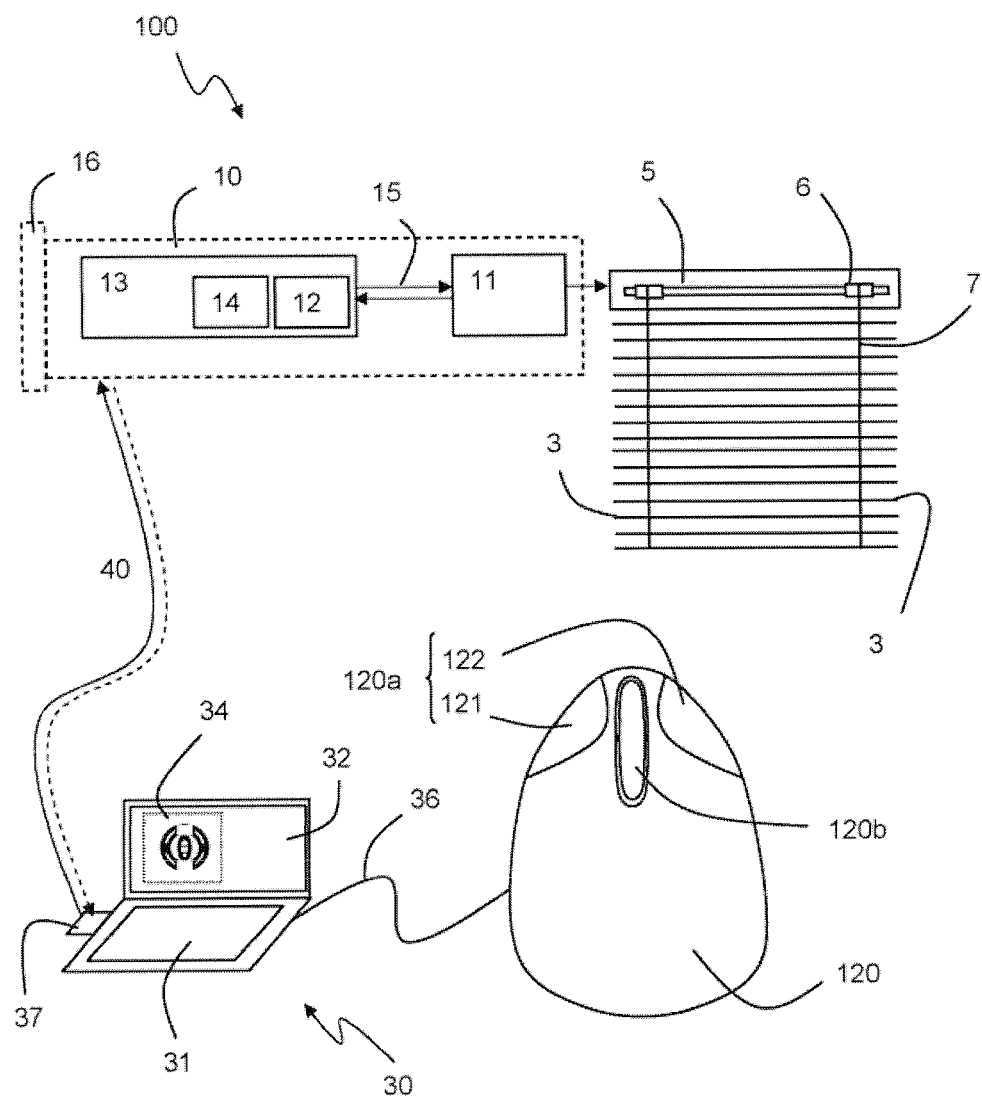
FIG. 2 illustrates a motor-driven screen device of the invention.

The device of the invention is schematically illustrated in FIG. 2. In this figure, the different elements composing the motor-driven screen device e.g. the actuator and the blind are identical and carry the same references.

The invention particularly relates to a control interface which can be substituted for or given complementary use with the previously described control point.

A computer 30 illustrated in FIG. 2 in the form of a personal portable computer comprises a keyboard 31 and screen 32 on which a display zone 34 is shown. The computer is connected to a pointer tool of mouse type, via a wire 36 or wireless connection. The mouse comprises control buttons 120a comprising a first main button 121 (or left-click button) and a second secondary button 122 (or right-click button). The mouse also comprises a thumbwheel 120b which can be actuated in a first and a second rotational direction. On the screen, a cursor 130 corresponds to the pointer tool whose relative movements on the screen correspond to movements of the mouse. Actuation of one of the selector buttons allows the selecting of an object pointed to on the screen by the cursor, or the obtaining of a menu list comprising a choice of actions to be carried out.

Alternatively, the pointer tool may be a unit integrated in the keyboard, for example comprising two mechanical buttons corresponding to the primary and secondary buttons of the mouse and a touch element. In this case, the touch element corresponds to the thumbwheel of the mouse. The tactile element comprises a contact region so that movement on this region causes movement of the cursor. The touch element may be a tactile pad or track point. In these different cases, action on the pointer tool allows movement of the cursor represented on the screen and/or scrolling of the elements contained in a display window on the screen. In the remainder hereof and for simplification, the mouse thumbwheel and the touch element integrated in the keyboard will be called a scroll-assisting element of the pointer tool. The purpose of the scroll-assisting element is to cause the scrolling of the content of a display in a window on the screen of a computer.

The computer comp material and software means (not illustrated) in particular to manage the display of an activation window, to dialogue with a local or remote server and to detect the movements and actuations of the pointer tool associated with the computer, and in particular to detect actions on the scroll-assisting element of the pointer tool.

The use of the pointer tool in combination with a display zone on the screen allows the controlling of separate items of home automated equipment, as would be possible when using the thumbwheel control point described above. The pointer tool then loses some of its functionalities related to functioning of the computer as office tool, to gain new control functionalities for controlling automated home equipment. These changes to functionalities are temporary.

In a first embodiment, the change in functionality occurs when the cursor is positioned in the display zone.

The application shown in the screen takes the form for example of a control window 34 in which a visual is graphically illustrated related to the use of the pointer tool as control point. This visual may be a graphical representation for example of the thumbwheel control point of the installation. Alternatively, it is a graphical representation of the element to be controlled, of the pointer tool itself or a logo associated with the communication technology used or with the manufacturer of the actuator.

FIG. 3 schematically illustrates the different steps of the method of the invention. At a step S1, the cursor on the screen associated with the pointer tool can be positioned in the box of the control window. The positioning of the cursor is obtained by action on the pointer tool: full movement thereof over a fixed surface, or action on the scroll-assisting element. Since the software means of the computer are capable of detecting the positioning of the cursor on the screen, they are capable of determining when the cursor is positioned at a point of the control window. At a step S2, the functionalities of the pointer tool are modified. For as long as the cursor of the pointer tool is not moved outside the control window, actuation of a right button determined at a step S3 causes the transmission of a movement command in a first direction, for example an opening command at a step S6. Actuation of the left button at a step S4 causes the transmission of a movement command in a second direction, for example a closing command at a step S7. Actuation of the scroll-assisting tool at a step S5 causes the transmission of an adjustment command for orientation in an associated direction i.e. a tilt command of the adjustable screen slats at a step S8. Since the scroll-assisting tool can be actuated in a first or second direction, the adjustment command can assume two forms: tilting in a first and in a second direction. The command received by the screen device is implemented by the actuator.

Alternatively to movement of the cursor in a window, the activation of this window or the opening of a control programme allows the functionality of the mouse to be changed without changing the method.

FIG. 4 schematises architecture of the communication system lending itself to implementation of the invention, and provides an explanation of the tangible and non-tangible relationships between the computer and the motor-driven screen device.

A Web server SV, either local (included in the material resources of the computer) or remote (remotely linked to the computer) provides a webpage containing a software application ("WebApp") displayable on the computer screen and information messages intended for users. This communication is represented by the arrow A1. This software application (in Javascript language for example) as is conventional allows detection of the movements and actuations of the pointer tool at computer level and in particular in the control window. When these actuations are detected, and a change in the functionalities of the pointer tool becomes active, the webpage software application generates data to be retransmitted to the server. This communication is illustrated by the arrow A2.

The data then transits via wire or wireless links of intranet or internet type or via local software connections if the server is itself housed at computer level. This server retransmits the data in the form of a comprehensible message to a Blind server SVS or control unit (like the Web server it can be local or remote). The corresponding communication illustrated by the arrow A3a can be made two-way with reverse communication (A3b), for example comprising acknowledgements of receipt of various information requests. The Blind server then re-transcribes the information in the form of a command comprehensible by the screen device (arrow A4a). In particular this Blind server comprises the hardware and software means to translate the information into command form, and ensure transmission to the addressee of the command. Alternatively, the management of the destination of the message, or of safety, is managed at another level in the data transmission chain. Messages of acknowledgement of receipt of commands can be returned by the device to the Blind server (arrow A4b), then optionally through different links described above as far as the display window on the computer screen where they are legibly displayed.

One alternative embodiment of the invention is more particularly illustrated in FIG. 2. In this embodiment, the method is entirely locally managed i.e. without passing through a link to a remote Blind server via a link of Internet type.

In particular a command key 37 comprising a command transmitter is connected to the computer, for example via a USB connection. This command key is paired with a control unit of the blinds located in the building (not illustrated) or directly with each blind individually. When actuation of the pointer tool is detected in cooperation with a change in functionalities of this tool, a local software application directly generates the commands to be transmitted via command key. The local software application is then either a programme run on the computer, or a combination of a webpage with a local Web server, retransmitting data to the key. The key then acts as Blind server.

The Web server and the Blind server may be one and the same data server. Alternatively, they may communicate using several technologies: Webservices, sockets, COM object, Messages (IPC), etc. The communication between the Blind server and the items of automated home equipment themselves may also use various known technologies (wire link e.g. RS485, Infrared, unidirectional or bidirectional radio).

The translation of movements and actuations of the pointer tool into commands can be managed directly by the local application managing the display of the webpage. Alternatively, it may be managed at the Web server or Blind server.

Insofar as the pointer tool can be used for commanding several items of automated home equipment, it is of interest to make provision so that they are represented or symbolised on the screen on the interface page in identifiable manner, for example by an icon 101 or photograph representing a device, positioned on a plan 102 of the building, as illustrated in FIG. 5. The positioning of the cursor on each icon (or activation of an icon) causes a change in functionality of the pointer tool. When action is applied to one of the buttons or to the scroll-assisting element, a command intended for the motor-driven screen device is generated in association with the sending of information concerning identification of the object to be commanded. Therefore, the same pointer tool can act very simply for the controlling of various items of automated home equipment.

To bring the pointer tool back to its initial configuration, it is possible either to cause it to move outside a zone of the screen associated with the controlling of equipment, or to use a keyboard key e.g. the Escape key.

The invention has been described in the foregoing in connection with the controlling of a blind with adjustable slats. However, in the same manner, it could also be used to control a lighting device, the scroll-assisting element then contributing towards the commanding of variation in light intensity.

The invention claimed is:

1. A method for controlling, in a building, a motor-driven mobile screen having adjustable slats, said slats being drivable by means of an electromechanical actuator in order to be deployed and/or have a change in orientation, the method being implemented through a control interface, wherein said control interface comprises:
 a personal computer comprising a keyboard and a display screen with a display zone,
 a pointer tool connected to said personal computer,
 wherein said pointer tool comprises at least one control button and a scroll-assisting element, and
 wherein the scroll-assisting element of the pointer tool causes the scrolling of content of a display in a window of the display screen of the personal computer,
 said method comprising:

a. a step of activating a control window on the display screen using the pointer tool;
b. a step of modifying the functionalities of the pointer tool, wherein functionalities of the pointer tool related to the functioning of the computer are changed to control functionalities for controlling the motor-driven mobile screen, wherein the control functionalities for controlling the motor-driven mobile screen include a deployment command or slat orientation command for controlling the motor-driven mobile screen, wherein the change of functionalities from functionalities related to the functioning of the computer to functionalities for controlling the motor-driven mobile screen is based upon whether a cursor associated with the pointer tool is within said control window on the display screen;
c. a step to detect mechanical action on said at least one control button or the scroll-assisting element of the pointer tool connected to said personal computer;
d. a step to directly interpret the detected mechanical action as the deployment command or the slat orientation command.

2. The control method according to claim 1, wherein the method comprises a prior activation step of a software element on the computer linked to the pointer tool.

3. The control method according to claim 2, wherein the activation step of the software element comprises an activation step of a graphical control element.

4. The control method according to claim 3, wherein the activation step of the graphical control element comprises positioning of the cursor of the pointer tool on the graphical control element.

5. The control method according to claim 1, wherein the method comprises a step of displaying at least in pall, on said display screen, a graphical representation of a remote control with a thumbwheel.

6. The control method according to claim 1, wherein the method comprises a step of displaying on said display screen one or more icons representing an item of automated home equipment to be driven, positioned on a plan of the building.

7. The control method according to claim 1, wherein double actuation (double-click) of said at least one control button of the pointer tool causes the transmitting of the deployment command towards a predefined intermediate position.

8. The control method according to claim 1, wherein the method comprises a prior step of pairing between the actuator and a command-transmitting device linked to the computer.

9. The control method according to claim 8, wherein the control device giving commands is a transmitter connected to said computer.

10. The control method according to claim 8, wherein the command-transmitting device is a transmission unit linked via Internet with said computer.

11. The control method according to claim 1, wherein functionalities of the pointer tool for controlling the motor-driven mobile screen are changed to the functionalities related to the functioning of said computer when said cursor moves from inside said control window to outside said control window.

12. The control method according to claim 1, wherein the method comprises a display step on said display screen of one or more icons representing an item of automated home equipment to be driven, positioned on a plan of the building.

13. A control interface for controlling a motor-driven mobile screen having adjustable slats by means of an electromechanical actuator, wherein said control interface comprises:
a personal computer comprising a computer screen and graphical representation of a software element on the screen,
wherein said personal computer comprises a computer pointer tool comprising a main button, a secondary button, and a scroll-assisting element,
wherein the scroll-assisting element of the pointer tool causes the scrolling of content of a display in a window of the computer screen of the personal computer, and
wherein said software element is programmed to execute a method for controlling the motor-driven mobile screen having the adjustable slats by means of the electromechanical actuator, in a building, the method comprising:
a. a prior step of activation of said software element on said personal computer linked to said pointer tool,
b. a step of selecting an object on said computer screen using said pointer tool;
c. a step where functionalities of said pointer tool related to the functioning of said computer are changed to control functionalities for controlling the motor-driven mobile screen, wherein the control functionalities for controlling the motor-driven mobile screen include a deployment command or slat orientation command for controlling the motor-driven mobile screen, wherein the change of functionalities from functionalities related to the functioning of the computer to functionalities for controlling the motor-driven mobile screen is based upon whether a cursor associated with said pointer tool is within said computer screen;
d. a step to detect mechanical action on said at least one control button, or the scroll-assisting element of said pointer tool connected to said personal computer;
e. a step to directly interpret the detected mechanical action as the deployment command or the slat orientation command of said mobile screen so as to set up a functional link between said main and secondary buttons of the pointer tool and the deployment command, and a functional link between said scroll-assisting element and the orientation command.

14. A control interface according to claim 13, wherein the method comprises a wireless command transmitter capable of communicating with the actuator.

15. The control interface according to claim 13, wherein the functionalities of the pointer tool for controlling the motor-driven mobile screen are changed to the functionalities related to the functioning of the computer when said cursor moves from inside the control window to outside said control window.

16. A method for controlling a lighting device with adjustable light intensity, in a building, the method being implemented through a control interface, wherein said control interface comprises:
a personal computer comprising a display screen with a display zone,
a pointer tool with at least one control button and a scroll-assisting element, wherein the pointer tool is linked to a computer,
wherein the scroll-assisting element of the pointer tool causes the scrolling of content of a display in a window of the display screen of the personal computer,
wherein said method comprises:

a. a step of selecting an object on said computer display screen using said pointer tool;
b. a step where functionalities of the pointer tool related to the functioning of said computer are changed to control functionalities for controlling the lighting device, wherein the control functionalities for controlling the lighting device include a switch-on or switch-off command or variation of light intensity command for controlling the lighting device, wherein the change of functionalities from functionalities related to the functioning of the computer to functionalities for controlling the lighting device is based upon whether a cursor associated with the pointer tool is within a control window on the display screen;
c. a step to detect mechanical action on a main button, a secondary button, or the scroll-assisting element of the pointer tool; and
d. a step to directly interpret the detected mechanical action as the switch-on or the switch-off command or the variation of light intensity command.

17. The method for controlling a lighting device according to claim 16, wherein the functionalities of the pointer tool for controlling the lighting device are changed to the functionalities related to the functioning of said computer when said cursor moves from inside the control window to outside said control window.

18. A method for controlling a motor-driven mobile screen having adjustable slats by means of an electromechanical actuator, in a building, the method being implemented through a control interface, wherein said control interface comprises:
  a personal computer comprising a display screen with a display zone,
  a computer pointer tool connected to said personal computer comprising at least one control button for deployment and a scroll-assisting element for adjusted orientation of the slats, wherein the pointer tool is linked to said personal computer,
  wherein the scroll-assisting element of the pointer tool causes the scrolling of content of a display in a window of the display screen of the personal computer,
  said method comprising:
a. a step of selecting an object on the display screen using said pointer tool;
b. a step where functionalities of the pointer tool related to the functioning of said computer are changed to control functionalities for controlling the motor-driven mobile screen, wherein the control functionalities for controlling the motor-driven mobile screen include a deployment command or slat orientation command for controlling the motor-driven mobile screen, wherein the change of functionalities from functionalities related to the functioning of the computer to functionalities for controlling the motor-driven mobile screen is based upon activation of a control window or opening of a control program on said display screen;
c. a step to detect mechanical action on a main button, a secondary button, or a scroll-assisting element of said pointer tool linked to said personal computer;
d. a step to directly interpret the detected mechanical action as the deployment command or the slat orientation command.

19. The control method according to claim 18, wherein the method comprises a prior activation step of a software element on said computer linked to said pointer tool.

20. The control method according to claim 19, wherein the activation step of the software element comprises activation of a graphical control element.

21. The control method according to claim 20, wherein the activation of the graphical control element comprises positioning of said cursor of the pointer tool on the graphical control element.

22. The control method according to claim 18, wherein the method comprises a display step on said display screen of a graphical representation at least in part of a remote control with thumbwheel.

23. The control method according to claim 18, wherein double actuation (double-click) of one of the buttons of said pointer tool causes the transmitting of the deployment command towards a predefined intermediate position.

24. The control method according to claim 18, wherein the method comprises a prior pairing step between the actuator and a command-transmitting device linked to said computer.

25. The control method according to claim 24, wherein the control device giving commands is a transmitter connected to said computer.

26. The control method according to claim 24, wherein the command-transmitting device is a transmission unit linked via Internet with said computer.

27. The control method according to claim 18, wherein the functionalities of the pointer tool for controlling the motor-driven mobile screen are changed to the functionalities related to the functioning of said computer when the a key is pressed on a keyboard associated with the computer.

* * * * *